United States Patent [19]
Cohen

[11] Patent Number: 6,080,982
[45] Date of Patent: Jun. 27, 2000

[54] EMBEDDED WEAR SENSOR

[75] Inventor: Edward Isaac Cohen, Severna Park, Md.

[73] Assignee: The United States of America as represented by the Secretary of the Navy, Washington, D.C.

[21] Appl. No.: 09/076,918

[22] Filed: May 13, 1998

[51] Int. Cl.[7] .................................................. G01M 11/08
[52] U.S. Cl. ................................ 250/227.11; 250/227.14; 340/682
[58] Field of Search .......................... 250/227.11, 227.14, 250/358.1; 73/86, 116, 118.1; 310/68 R; 340/672, 682

[56] References Cited

U.S. PATENT DOCUMENTS

| | | |
|---|---|---|
| 3,981,621 | 9/1976 | Considine . |
| 4,092,053 | 5/1978 | Riegler et al. . |
| 4,107,603 | 8/1978 | Slough . |
| 4,143,319 | 3/1979 | Rouam . |
| 4,328,462 | 5/1982 | Jensen . |
| 4,348,665 | 9/1982 | Rode et al. . |
| 4,509,364 | 4/1985 | Schutz et al. . |
| 4,655,077 | 4/1987 | Purvis et al. . |
| 4,884,434 | 12/1989 | Satake et al. . |
| 5,015,859 | 5/1991 | Uejio . |
| 5,060,307 | 10/1991 | El-Sherif . |
| 5,258,930 | 11/1993 | Fukuyoshi et al. . |
| 5,389,411 | 2/1995 | Cohen . |

OTHER PUBLICATIONS

"NSWC/CD Explores Smart Sensors for Prop Wear," *Naval Systems Update* (*Navy Ship and Submarine Systems Integration and Program News*), Advanced Document Services, P.O. Box 2697, Woodbridge Virginia 22193, Edward J. Walsh, Editor, Jul. 31, 1998, pp. 9 and 12.

Edward I. Cohen, Stephen A. Mastro, Christopher P. Nemarich, Joseph F. Korczynski Jr., Andrew W. Jarrett and Wayne C. Jones, "Recent Developments in the Use of Plastic Optical Fiber for an Embedded Wear Sensor," paper (12 pp) presented at SPIE's (The International Society for Optical Engineering) Sixth Annual International Symposium on Smart Structures and Materials, Mar. 1–5, 1999, Newport Beach, California.

Udd, Eric, *Fiber Optic Smart Structures,* John Wiley and Sons, Inc., New York, 1995, title page, publisher's page, contributors (pp. v–vi), contents (pp. vii–viii), chapter 1 all (pp. 1–4), chapter 2 all (pp. 5–21), chapter 4 all (pp. 61–107), chapter 5 all (pp. 109–119), chapter 6 all (pp. 121–153), chapter 7 all (pp. 155–169), chapter 8 part (pp. 198–201), chapter 23 all (pp. 647–665).*

"Murphy: Surface force reduces crews, invests in tech," *Navy News & Undersea Technology,* vol. 14, No. 41, Oct. 20, 1997.

Troy, Charles T., "Fiber Optic Smart Structures: A Technology Ahead of Its Time is Finally Winning Acceptance," *Photonics Spectra,* vol. 31, Issue 5, May 1997, pp. 112–127.

(List continued on next page.)

*Primary Examiner*—Stephone B. Allen
*Attorney, Agent, or Firm*—Howard Kaiser

[57] ABSTRACT

Fiber optic filaments are embedded at a bearing surface. In the context of a mechanical bearing system, the filaments wear as the surface wears. Based on the observed amount of light which is transmitted through the filaments, the degradation of the filaments is related in a measurable way to the wear of the bearing surface. The sole power requisite for inventive operation is light, for observation purposes. As compared with convention approaches to wear measurement, the invention more accurately measures wear of the bearing itself and is therefore a better predictor of servicing requirements. Inventive practice of remote wear monitoring is a viable and preferable option.

20 Claims, 8 Drawing Sheets

OTHER PUBLICATIONS

Bouve M.S., R.M. DeJesus and J.E. Reed, "Main Propulsion shaft Alignment Assessments Using Strain Gage Technology," Paper No. 10, ASNE 1993 Fleet Maintenance Symposium.

Vassilopoulos, L., "Computer–Aided Telemetry Systems for Shipboard Rotating Machinery Investigations," Paper No. 25, 1987 Ship Operations Management and Economics International Symposium, SNAME.

El–Sherif, M.A. and Fran Ko, "Co–braiding of sensitive optical fiber sensor in 3–D composite fiber network," 2/SPIE vol. 1798 Fiber Optic Smart Structures and Skins V, 1992.

"Propulsion Bearing and Seals," NAVSEA S9086–HN–STM–010/CH–244R4, Mar. 22, 1996.

Crane, Roger M., A.B. Macander, and James Gagorick, "Fiber Optic Assessment system for Fiber Reinforced Plastic Composite Structures,"DTNSRDC SME–82/92, Nov. 1982.

Whitesel, Henry K., Christopher P. Nemarich, Michael J. Ransford, "Fiber Optic Sensors for Machinery Monitoring and Control," 48th Meeting of the Society for Machinery Failure Prevention Technology, Wakefield, MA, Apr. 20, 1994, pp. 307–317.

Coyle, Daniel, J., Richard J. Patterson, "Fiber Optics for Combat Ships," ASNE Intelligent Ships Symposium, Nov. 25–26, 1996, Philadelphia, PA, pp. 53–64.

Sun D., K. Kalli and R.O. Caus, Optical Fiber Embedment and Attachment Techniques and Survivability Issues, Fiber & Electro–Optics Research Center, Electrical Engineering Department, Virginia Tech Univ., Blacksburg, Va, CARDIVNSWC–TR–85–CR–94/Mar. 3, 1994.

Bhatia, Vikram, Vivek Arya, Tiffanie d'Alberto, et al., "Grating Based Optical Fiber Sensors for Structural Analysis," 51st Meeting of the Society for Machinery Failure Prevention Technology, Virginia Beach, VA, Apr. 14–18, 1997, pp. 231–240.

Udd, Eric, *Fiber Optic Smart Structures,* John Wiley and Sons, Inc. New York, 1995, pp. 12–17, 156–163, 198–201, 650–657.

"Sealless Canned Motor Pumps Are the Solution for World's Largest Producer of Alkylphenols," by Pumps and Systems Staff, *Pumps and Systems Magazine,* May 1998, pp. 16, 18–19.

"Fibre Optic Wear Gauge for MCMV A–Bracket Installation" (22 pages), Report No. JD308/R2035, Issue 1, Date Jan. 1992, BMT (British Maritime Technology) Defence Services Limited, Marples Wharf, Bath, BA2 3dQ.

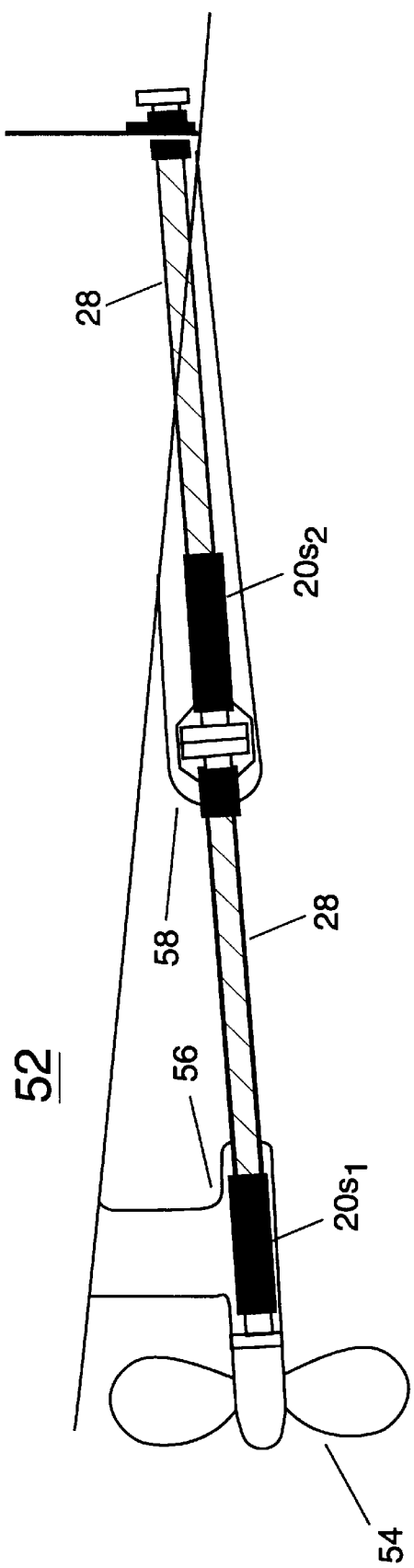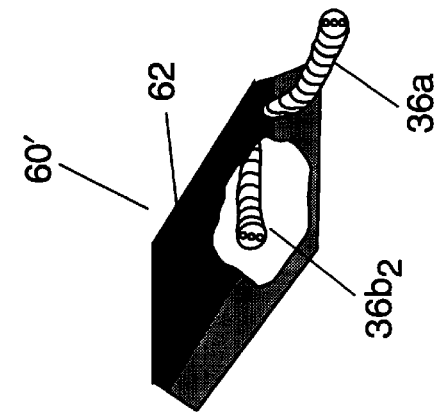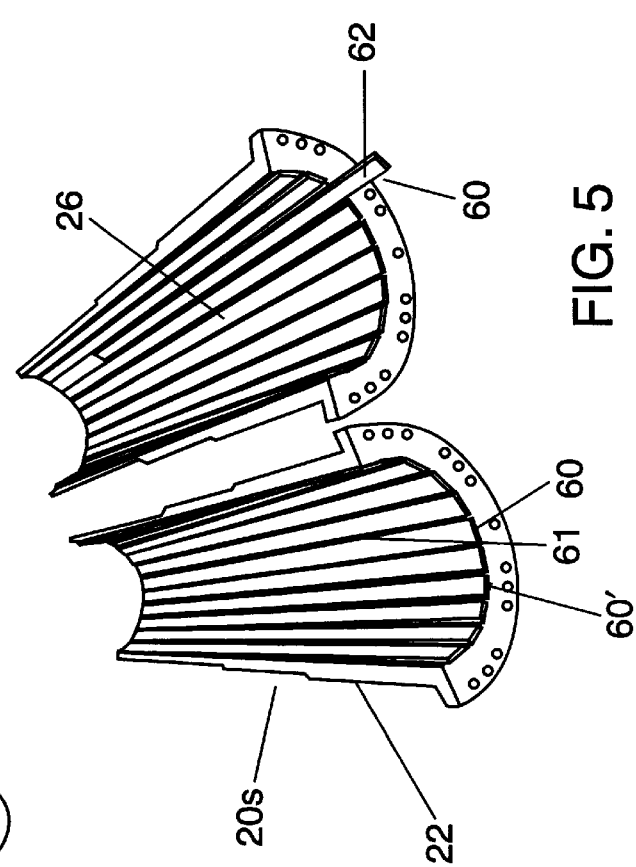

| BRG 2A / FWD/P ||
|---|---|
| WEAR | 75% |
| TEMP | 125°F |
| PRESSURE | 25 PSI |

EMBEDDED WEAR SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for determining mechanical wear, more particularly to such methods and apparatuses wherein the mechanical wear pertains to interaction of a bearing with a non-bearing entity.

Mechanical wear is a typical phenomenon of various types of machinery. The relative motion of contacting solid surfaces can cause damage to either or both surfaces. Generally, such damage is manifested as a progressive loss of material. Many varieties of mechanical systems are characterized by mechanical wear. It is a common necessity that the degree of wear which is associated with a particular mechanical system be ascertained.

In this regard, of particular interest herein are mechanical systems which are or include "mechanical bearing systems," in which a non-bearing body (e.g., machine part or component) is wearingly interacting with a bearing. The nature and operating environment of a given mechanical system generally determine, to at least some extent, the type or types of bearings to be utilized.

Among the many conventional genres of mechanical bearing systems are those which include a rotatable shaft. The need may arise to determine the installed clearance between the shaft and a bearing in a mechanical bearing system wherein the bearing has an inside surface, or a portion thereof, which slidingly contacts the shaft.

In naval applications, for instance, a water lubricated main propulsion line shaft can wearingly interact with its bearing. Conventional approaches to determining such clearances have involved manual utilization of a device such as round (circular) feeler gauge. The operator of a round feeler gauge installs the gauge around the shaft circumference, between the shaft and the bearing.

Generally, such conventional techniques are unwieldy and/or inaccurate. The wear area of interest may be so situated as to be inaccessible or not readily accessible. Under normal, dynamic conditions (i.e., when a ship is voyaging over water), it may be an awkward, clumsy proposition for a person to operate a feeler gauge instrument at a given location or within a given configuration. In situations involving ship machinery, although it may be easier to measure wear under static conditions (i.e., when the ship is in dry dock rather than at sea), the resultant measurements may not be accurate since they do not represent dynamic or true operating conditions.

SUMMARY OF THE INVENTION

In view of the foregoing, it is an object of the present invention to provide method and apparatus for accurately determining the degree of wear in a mechanical bearing system, wherein a bearing element and a non-bearing element interact.

It is a further object of this invention to provide such method and apparatus which are feasible and accurate under both static and dynamic conditions.

It is another object of this invention to provide such method and apparatus which do not require manipulation of a clearance-measuring device.

The present invention uniquely features the embedment of sacrificial fiber optic material at a bearing surface which is subject to wear due to sliding contact with another (non-bearing) object. The wear ascertainment methodology of this invention avails fiber optic technology so as to afford remote wear-detecting/monitoring capability.

In accordance with the present invention, a wear detector combination comprises a bearing member and a fiber optic line. The fiber optic line includes at least one optical fiber. The bearing member includes a bearing surface. The fiber optic line accesses and exits the bearing member, typically approximately parallel to the measured surface. A segment of the fiber optic line is embedded at the bearing surface, typically in a wearing portion of the bearing surface.

According to many inventive embodiments, the wear detector combination further comprises a light emitter and a light receptor. The light emitter is connected at a first end of the fiber optic line. The light receptor is connected at a second end of the fiber optic line. The bearing surface is for sliding contact with a relatively moving body. The light emitter emits a first amount of light. The light receptor receives a second amount of light which follows the transmission of the first amount of light through the fiber optic line segment which is embedded at the bearing surface. The diminution of the second amount of light versus the first amount of light is a function of the deterioration of the fiber optic line segment which is embedded at the bearing surface. The deterioration of the fiber optic line segment which is embedded at the bearing surface is commensurate with the wear of the bearing surface. Hence, the diminution of said second amount of light is evidentiary of the wear (relative wear) of the bearing surface.

Generally speaking, it is preferable inventive practice that the fiber optic line segment be embedded at the bearing surface, in a wearing portion of the bearing surface, so as to characterize wear. Inventive wear characterization by an embedded fiber optic segment generally entails a situation wherein the embedded fiber optic segment is roughly or nearly "even" or "flush" with the bearing wear surface. For most inventive embodiments, this wear characterization describes a relative positioning wherein the fiber optic wear segment is embedded in the bearing wearing portion to a substantially uniform depth (beneath the top surface) in the range approximately bounded by one-half "width" above and one-half "width" below the bearing wearing portion; generally and with some approximation, the "width" is the width measurement of the fiber optic line. That is, the linear apex of the embedded fiber optic wear segment is located in the range between 0.5 width unit above the top surface of the wearing portion and 0.5 width unit above the bottom delimitation of the wearing portion.

This invention obviates the need for awkward operation of manual instrumentation in hard-to-reach spaces. Also, the inventive embedded fiber optic bearing wear sensing can be accurately effectuated on an ongoing basis, regardless of whether nautical conditions are static or dynamic. This invention thus affords the truer measurements which are associated with dynamic conditions, and thus obviates the need to wait opportunistically for static conditions to obtain for purposes of assessing machine wear.

Moreover, it is a frequent phenomenon of mechanical bearing systems that the wearing element tends to be the bearing itself, rather than the machine part or component. This would generally be so when the machine (non-bearing) element is basically made of a harder (e.g., metallic) material while the bearing element is basically made of a softer (e.g., elastomeric) material. Therefore, the present invention, by directly measuring wear of the bearing element, provides a more relevant reading in terms of maintenance than does a conventional methodology which measures distance between contacting mechanical elements.

The inventive embedded fiber optic bearing wear sensor itself wears in coherence with the overall wear of the mechanical bearing system. The inventive embedded fiber optic bearing wear sensor is thus a direct participant in the tribological system of interacting surfaces which characterizes the mechanical bearing system. Unlike a periodic static measurement, an inventive measurement is made relative to the condition of the bearing wear surface as it existed prior to commencement of wear; a "relative" wear measurement in real time and of historical record results.

The present invention therefore affords a more accurate measurement of bearing wear down, thus permitting better predictions on when machinery must be serviced.

Furthermore, no power is required to maintain the inventive bearing wear sensor; power is required only for observation arid in the form of light. This light source may derive from a central grid where data is collected, or from a temporary source used only for data-gathering purposes. Moreover, an inventive wear sensor system having a remote viewing capability will allow for the measurement of relative bearing wear in places for which such was previously impossible.

The present invention admits of application to any bearing system which allows for the embedment of a fiber optic line (e.g., fiber or cable). Basically speaking, this embedment of a fiber optic line can be inventively accomplished in either of two ways, viz., (i) by means of insertion of the fiber optic line after the bearing has been made (for example, by machining the bearing and adhesively bonding the fiber optic line in place); or, (ii) by means of molding the fiber optic line into the bearing during construction of the bearing.

Nevertheless, this invention is most beneficially practiced in relation to sliding-contact bearings, as distinguished from rolling-contact (rolling element, e.g., ball or roller) bearings and non-contacting (e.g., hydrostatic and magnetic) bearings. This invention can be propitiously practiced in relation to sliding-contact bearings of all types. Slicing-contact bearings experience wear due to two-body or three-body abrasive wear. Two-body wear is commonly referred to as rubbing (galling and/or adhesive wear). Three-body wear is commonly referred to as abrasion.

On the other hand, the present invention affords little or no benefit when practiced in relation to rolling element bearings or non-contact bearings. Non-contacting bearings experience no wear from rubbing or abrasion. Rolling element bearings, by contrast, rely on highly loaded surfaces in contact which promotes elastohydrodynamic lubrication.

Even with regard to sliding-contact bearings, however, the facility or practicality of inventive practice may depend upon the bearing application. For instance, a bearing may not be conducive to the insertion or the embedment of the fiber optic line due to the forbidding or peculiar character of the contacting surface or the subsurface structural configuration, as may especially be found with some highly loading sliding-contact bearings.

For terminological convenience herein, the term "continuous-surface bearing" refers herein to any sliding-contact bearing (such as a plain bearing, journal bearing or bushing) which has a continuous or substantially continuous inside surface. For example, the inside surface of a plain bearing can be approximately cylindrical (circular), or approximately elliptical, or configured so as to have one or more tapered bores, or configured so as to comprise a plurality of (e.g., three) lobes.

A continuous-surface bearing typically has an inside surface which has some degree of curvilinearity in the circumferential direction. The "circumference" of the inside surface of a continuous-surface bearing is the perimeter of the curvilinear closed figure which, considering the overall inside surface, is generally defined in the circumferential direction. The "circumference" of a continuous-surface bearing essentially extends "full-circle" (i.e., 360 degrees circumferentially).

The term "discontinuous-surface bearing" refers herein to any sliding-contact bearing (such as a stave bearing, tilting-pad bearing or partial arc bearing) which has at least one discrete inside surface approximately defining an "arc portion"; i.e., there is at least one discrete inside surface which extends less than 360 degrees with respect to the "circumference" which could be conceived to be generally defined by the bearing's aggregate inside surface if it were imagined to be rendered "continous."

A stave bearing, for instance, is a discontinuous-surface bearing having an aggregate inside surface which is divided or segmented, i.e., which comprises a plurality of discrete inside surfaces. Each stave is a discrete bearing member which has a width taken in the circumferential direction. Notwithstanding the individual stave configurations, the totality of the discrete inside surfaces can be considered to generally define a "circumference."

Regardless of whether an inventive embodiment pertains to a continuous-surface bearing or to a discontinuous-surface bearing, generally this invention is characterized by: entry of the optical fiber(s) into the bearing in the axial direction; redirection of the optical fiber(s) toward an inside bearing surface; embedded disposition of the optical fiber(s) along the inside bearing surface in the circumferential direction; and, wearing of the optical fiber(s) along the shaft in the circumferential direction, which is the direction of shaft rotation.

Depending upon the inventive embodiment, the optical fiber(s) can be embeddedly disposed either entirely around or partially around the "circumference" of the inside bearing surface. When the invention is practiced in relation to continuous-surface bearings, the optical fiber(s) can be embeddely disposed along the entire circumference or along one or more portions of the circumference. When the invention is practiced in relation to discontinuous-surface bearings, the optical fiber(s) can be embeddely disposed along one or more portions of the circumference.

The U.S. Navy conducted preliminary testing (at the Annapolis, Maryland Detachment of the Naval Surface Warfare Center, Carderock Division) on a specimen sample, a rubber stave portion in the form of an approximately one-inch block. Polycarbonate fiber, sheathed in polyethylene, was mechanically inserted and bonded at a face surface of the sample. The cursory experiment confirmed that the light extinguished after most of the fiber was worn through. The amount of wear at the sample's face surface, as measured with a ball end micrometer, was approximately 0.044 inches; this measurement was nearly confirmed dynamically with a crude dial indicator which measured approximately 0.037 inches.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 4 is a diagrammatic elevational view of an inventive application wherein a stave bearing used in a typical ship outboard shafting arrangement is inventively provided with fiber optic wear sensing capability.

FIG. 5 is a diagrammatic partial perspective view of an embodiment of an inventive stave bearing (wherein the two end stave retaining members are not shown) such as can be used in the application shown in FIG. 4.

FIG. 9 is a diagrammatic partial perspective view of the inventive stave shown in FIG. 8.

DETAILED DESCRIPTION OF THE INVENTION

Figure 1:
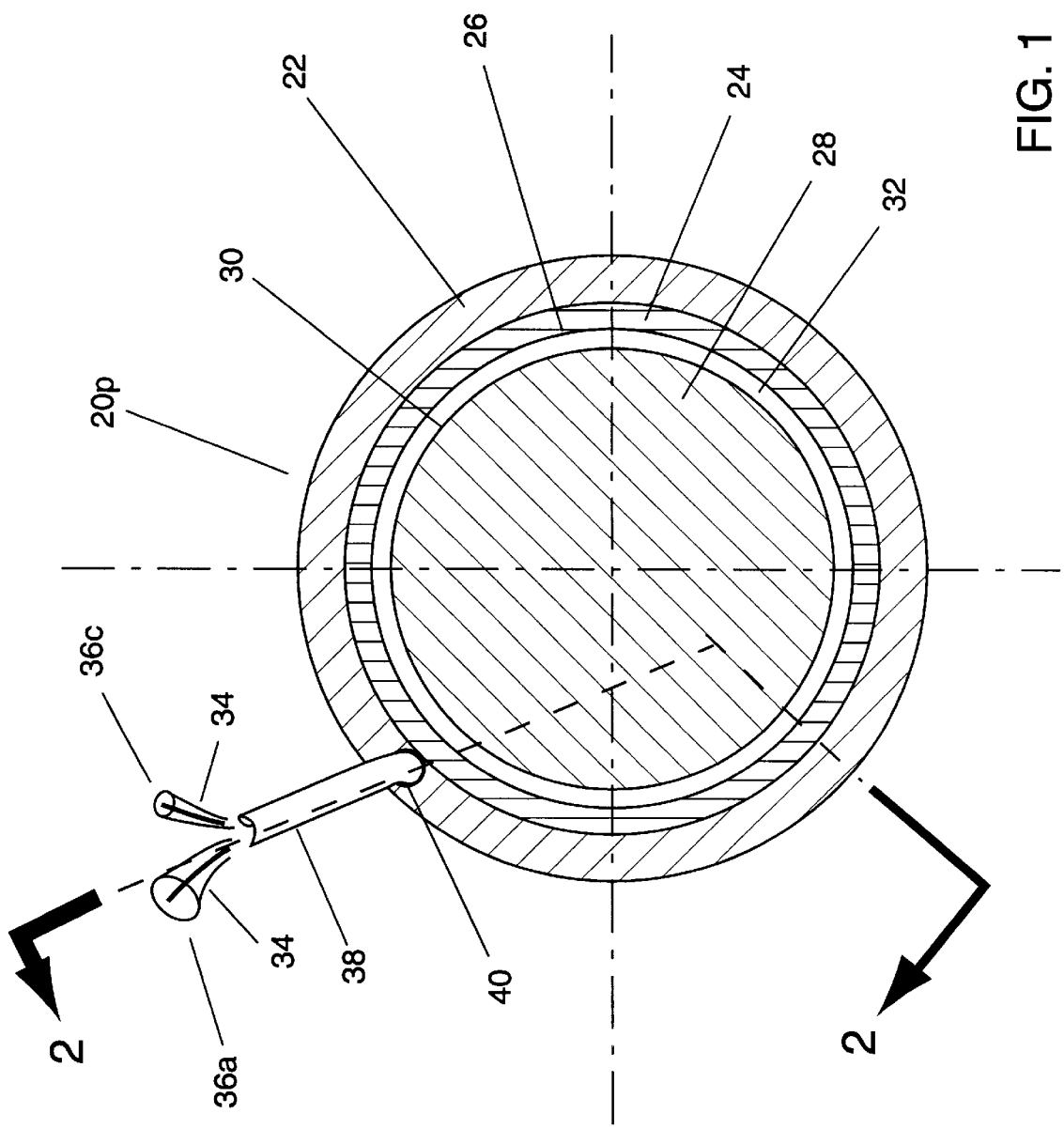
FIG. 1 is a diagrammatic elevational end view, partially in section, of an inventive embodiment wherein a plain bearing used in a typical plain bearing-shaft arrangement is inventively provided with fiber optic wear sensing capability.
Figure 2:
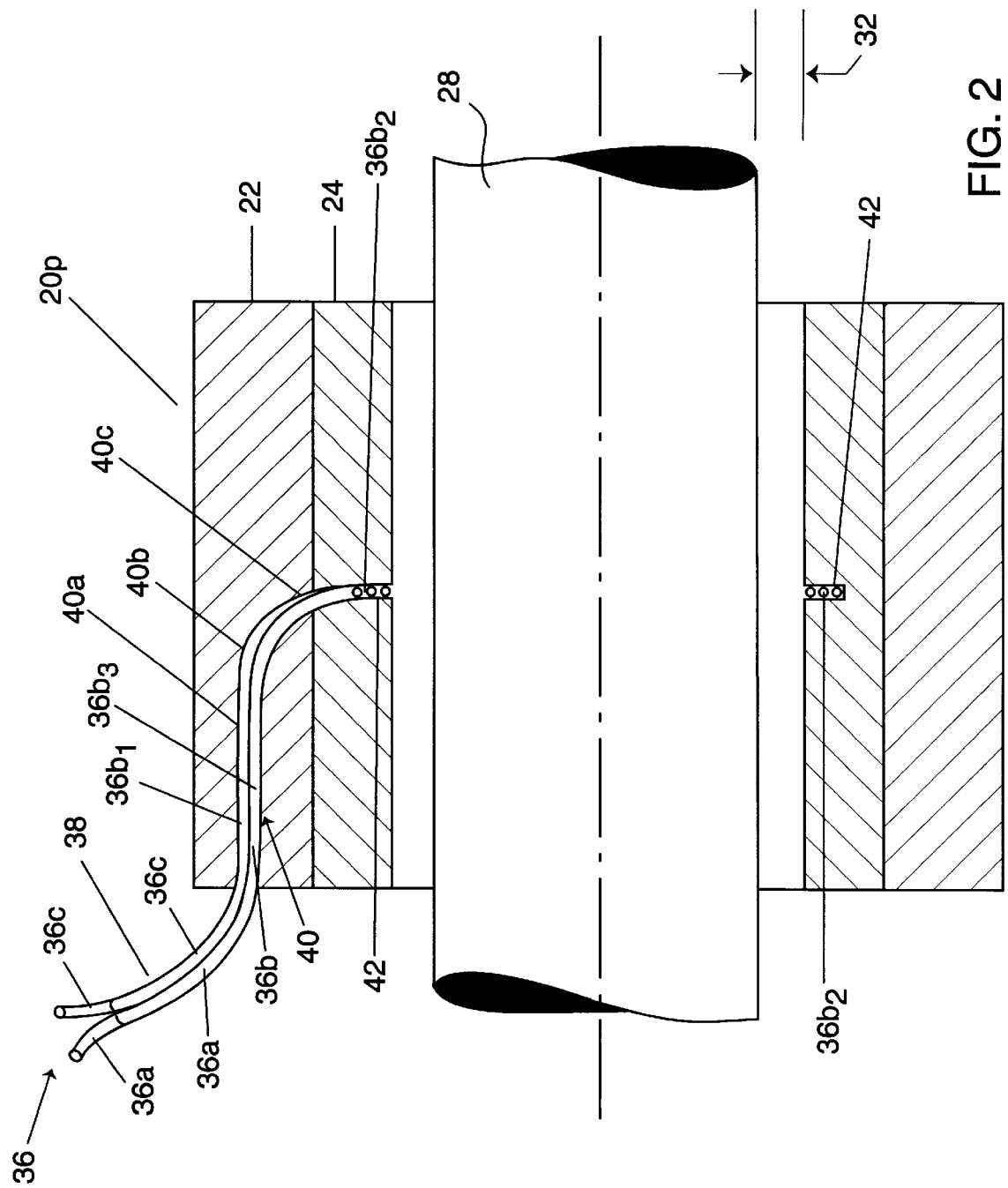
FIG. 2 is a diagrammatic longitudinal view, partially in section in accordance with line 2—2 shown in FIG. 1, of the inventive plain bearing-shaft configuration shown in FIG. 1.

Referring now to FIG. 1 and FIG. 2, plain bearing 20p includes bearing shell 22 and bearing liner 24. Bearing shell 22 is typically a structure made of a composite or metal material. Bearing liner 24, which includes inside bearing (wear) surface 26, is typically a low friction, long wearing, self lubricating structure (e.g., elastomeric) which is able to promote fluid films under dynamic conditions.

Cylindrically shaped shaft 28, typically made of a metal alloy, has hardened polished outside shaft surface 30. Shaft 28 can alternatively be envisioned to include a shaft sleeve which includes outer shaft surface 30.

Bearing gap 32 is the radial distance between inside bearing surface 26 and outside shaft surface 30. In other words, bearing gap 32 is the difference between the shaft 28 outside radius (or outside diameter) and the bearing liner 24 inside radius (or inside diameter).

Fiber optic bundle 36 (e.g., a fiber optic cable) includes a plurality of 19 optical fibers 34 (fiber optic filaments). Optical fibers 34 are packaged in fiber optic bundle 36 so as to be contained in an organized fashion. Fiber optic bundle 36 is caused to be disposed ingressively and egressively with respect to bearing 20p.

Fiber optic bundle 36 can be considered in terms of various portions or segments thereof. Fiber optic bundle 36 includes incoming bundle segment 36a (which does not engage plain bearing 20p), engagement bundle segment 36b (which engages plain bearing 20p) and outgoing bundle segment 36c (which does not engage plain bearing 20p). Engagement bundle segment 36b is intermediate (between) incoming bundle segment 36a and outgoing bundle segment 36c.

Engagement bundle segment 36b includes ingressive bundle segment $36b_1$, wear bundle segment $36b_2$ and egressive bundle segment $36b_3$. Circumferentially disposed wear bundle segment $36b_2$ is intermediate (between) ingressive bundle segment $36b_1$ and egressive bundle segment $36b_3$. FIG. 2 is diagrammatically adapted slightly to better illustrate bundle segments $36b_1$, $36b_2$ and $36b_3$.

Although one fiber optic bundle 36 is shown in FIG. 1 and FIG. 2 for illustrative purposes, depending upon the inventive embodiment inventive practice can provide for various numbers and arrangements of optical fibers 34. For instance, one or more optical fibers 34 can be discretely implemented by this invention; or, according to this invention, plural optical fibers 34 can be bundled in each of one or more fiber optic bundles 36; or, some combination thereof can be inventively effectuated. In other words, inventive practice can involve utilization of one or more fiber optic "lines" wherein each fiber optic line comprises one or more optical fibers 34, however configured.

Plain bearing 20p has been inventively adapted to accommodate optical fibers 34. Bearing shell 22 has a lateral bearing passage 40. Bearing liner 24 has circumferential groove 42 which is in communication with lateral passage 40.

Lateral bearing passage 40 can be considered to include an approximately axial passage section 40a, a transitional passage section 40b and an approximately radial passage section 40c. Bearing passage 40 at first proceeds approximately axially (designated axial passage section 40a). Then, bearing passage 40 turns, curves or veers (designated transitional passage section 40b). Finally, bearing passage 40 adopts an approximately radial direction (designated radial passage section 40c) until reaching circumferential groove 42.

According to this invention, lateral passage 40 can be a lateral conduit 40 for optical fibers 34. Lateral conduit 40, circumferential channel 42 and fiber optic bundle 36 have together been molded in integral fashion.

According to a typical inventive molding process, wear bundle segment $36b_2$ is exposed while engagement bundle segment 36b is cast or molded in place.

Alternatively, in inventive practice lateral passage 40 can be a lateral bore 40. Prior to introduction of fiber optic bundle 36, lateral bore 40 and circumferential groove 42 have each been mechanically provided (e.g., machined). Lateral bore 40 serves as a pilot opening for insertion (entry) and withdrawal (exit) of fiber optic bundle 36. Fiber optic bundle 36 is inserted into lateral bore 40 whereby wear bundle segment $36b_2$ is visibly set in place circumferentially in circumferential groove 42. Bundle cover 38, a protective sheath for fiber optic bundle 36, can be provided so as to extend at least partially through lateral bore 40.

Figures 10, 11:
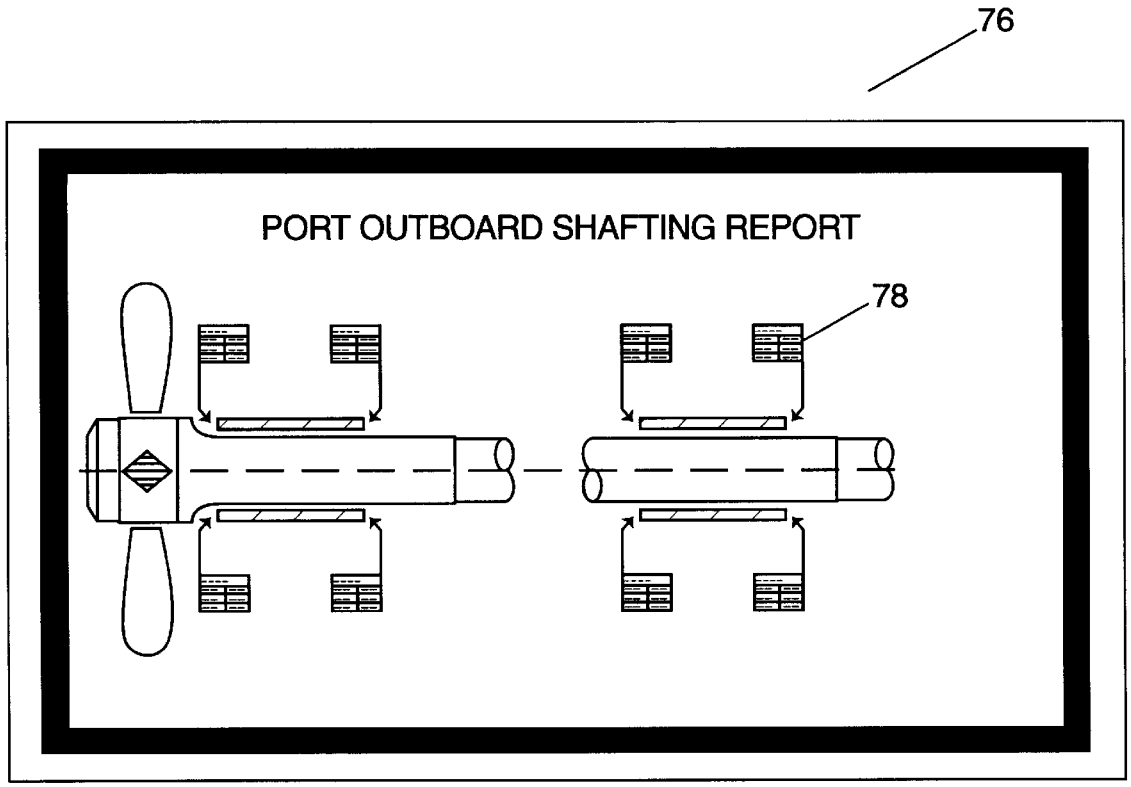
FIG. 10 is a diagrammatic elevational view of an inventive embodiment of a computer graphics display for a typical ship outboard shafting arrangement such as shown in FIG. 4.
FIG. 11 is a partial and enlarged version of the view shown in FIG. 10.

Circumferential bearing channel 42 is a slot, groove, conduit or furrow within which fiber optic bundles 36a and 36b are securely situated. The "erosion" of (i.e., removal of optic material from) fiber optic bundle 36 (specifically, wear bundle segment $36b_2$) is commensurate with the wear of bearing liner 24 at bearing surface 26. Each optical fiber 34 is a thin-diameter light-transmitting filament, made of plastic (e.g., polycarbonate) or glass, which is calibrated so that, when severed, the resultant failure thereof to transmit light is indicated, for example by a graphical display such as shown in FIG. 10.

Figure 3:
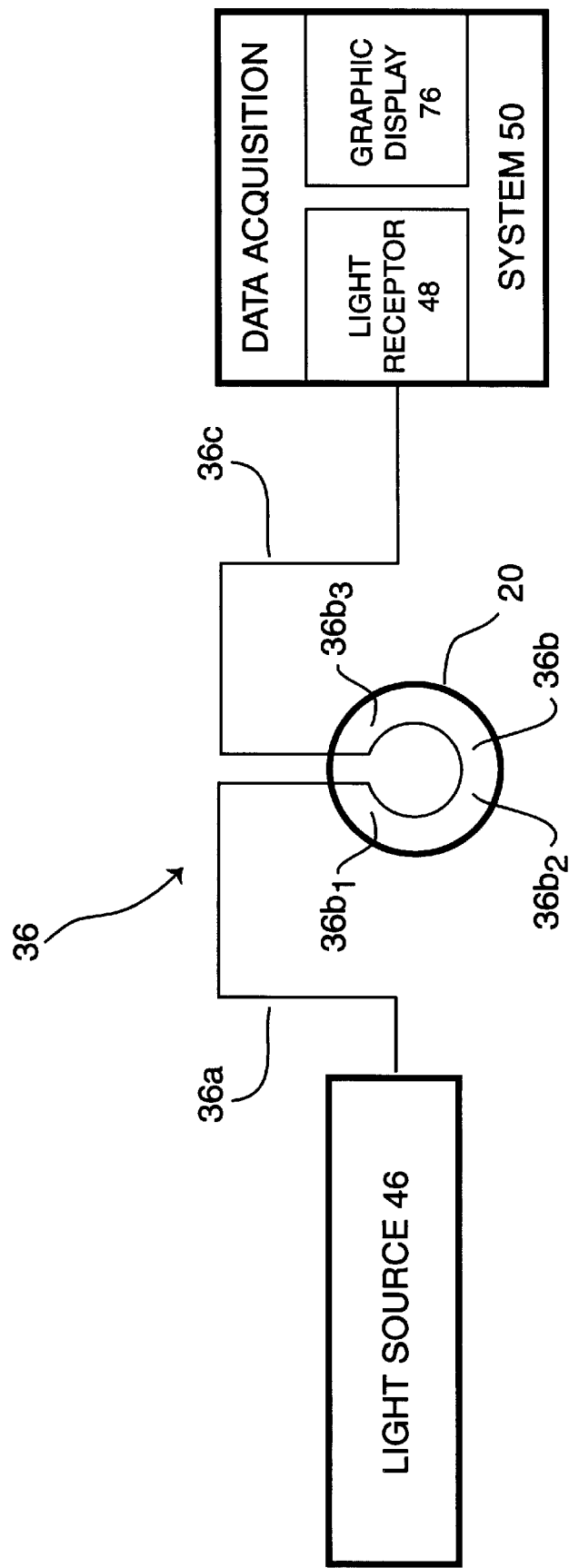
FIG. 3 is a schematic presentation of an inventive embodiment of a bearing wear monitoring system.

Still with reference to FIG. 1 and FIG. 2 and also with reference to FIG. 3, a fiber optic line (such as fiber optic bundle 36) is inventively disposed in relation to a bearing (such as plain bearing 20p) whereby: incoming bundle segment 36a leads from light source 46, which is capable of generating light (e.g., electromagnetic radiation); ingressive bundle segment $36b_1$ entry-wise passes through lateral passage 40; wear bundle segment $36b_2$ is fixed within circumferential channel 42 and thereby traverses the desired/anticipated wear region within bearing liner 24; egressive bundle segment $36b_3$ exit-wise passes through lateral passage 40; outgoing bundle segment 36c leads to light receptor 48, where the transmitted light may be observed. For some inventive embodiments, light receptor 48 is included in data acquisition system 50.

The U.S. Navy has expressed certain objectives, in furtherance of efficiency, for its twenty-first century surface combatants. Notably, the U.S.

Navy wishes to undertake condition-based maintenance (CBM) intiatives to reduce or eliminate the need for time-based maintenance actions. Also, the U.S. Navy wishes to reduce numbers of personnel onboard the next generation surface ships. Reduction in personnel will result in fewer personnel available in machinery spaces and will change the ship maintenance process.

Thus, the U.S. Navy is promoting the notion of automated remote control and monitoring of shipboard equipment, machinery and systems. The U.S. Navy is now working with industry to incorporate embedded diagnostics, training and condition assessment into the propulsion machinery design of surface ships. See "Murphy: Surface force reduces crews, invests in tech," *Navy News & Undersea Technology*, Vol. 14, No. 41, Oct. 20, 1997, incorporated herein by reference.

One system, however, which poses a difficult challenge to remote condition monitoring is the outboard shaft line system on surface ships. In particular, remote condition monitoring and assessment of the external shaft and outboard bearings has been impeded by various factors, e.g., lack of accessibility and lack of low cost, robust sensors for the severe environment. The present invention affords a unique, practical and effective methodology for implementing embedded sensor technology. The benefits of this invention are manifest in applications involving the U.S. Navy's surface ship outboard shaft line system as well as in multifarious other applications.

Reference now being made to FIG. 4, U.S. Naval surface combatants transmit shaft horsepower from a prime mover and gearbox arrangement through a long slender rotating shaft 28 of considerable length relative to ship hull 52. A system of inboard and outboard bearings is required by the transmitting of the ship's thrust, the supporting of the shaft 28 weight, and the maintaining of shaft 28 under propulsive loading. Typically, the inboard bearings (not shown) are oil lubricated bearings, and the outboard bearings (shown as strut bearing $20s_1$ and stern tube bearing $20s_2$) are water lubricated stave bearings.

Strut bearing $20s_1$ is housed near propeller 54 and within strut housing 56, a cylindroid fairwater structure which extends from hull 52. Stern tube bearing $20s_2$ is similarly housed within another fairwater cylindroid structure, viz., stern tube housing 58. Stern tube housing 58 is a flow covering extending from the waterborne steel tube fixture which surrounds shaft 28. Stern tube housing 58 encloses the propulsion shafting 28 in the vicinity where it "pierces" hull 52.

With reference to FIG. 5, for shaft diameters of six inches or greater, the U.S. Navy generally utilizes "class ll" stave bearings 20s both as strut bearings and as stern tube bearings. The class III stave bearing typically comprises a bronze shell 22 which is split longitudinally into two halves, such as shown in FIG. 5.

The outer surface of shell 22 is machined with steps to bear on matching lands in the cavity of strut housing 56 or of stern tube housing 58.

One end of shell 22 is bolted to strut housing 56 or to stern tube housing 58.

Shell 22 is grooved longitudinally to accommodate staves 60, which are non-metallic backed synthetic strips. Typically the existing stave material includes a synthetic rubber wear surface which is bonded to a harder plasto/rubber-like backing.

Staves 60 provide the bearing wear surface. Stave bearing water channels 61, located between staves 60, bring water into stave bearing $20s_1$ or $20s_2$ and provide a path for flushing grit and frictional heat away from stave bearing $20s_1$ or $20s_2$. A hydrodynamic lubrication film forms as the shaft speed increases, resulting in separation of shaft 28 from inside stave bearing surface 26, which is the general (overall) inside surface essentially defined by inside stave surfaces 62 of the individual staves 60.

Either strut bearing $20s_1$, or stern tube bearing 20s, or both strut bearing $20s_1$ and stern tube bearing $20s_2$, can be inventively adapted to accommodate optical fibers 34. Insofar as individual stave bearings are concerned, depending on the inventive application, one or more staves 60 of a given stave bearing 20s can be selected for inventive embedment of wear sensing capability. An embedded fiber optic bearing wear sensor which is inventively implemented in an application involving a stave bearing can more conveniently be referred to as a "stave sensor." As the term is used herein, a "stave sensor" is a stave which has been inventively endowed with wear-sensing capability.

Figure 6:
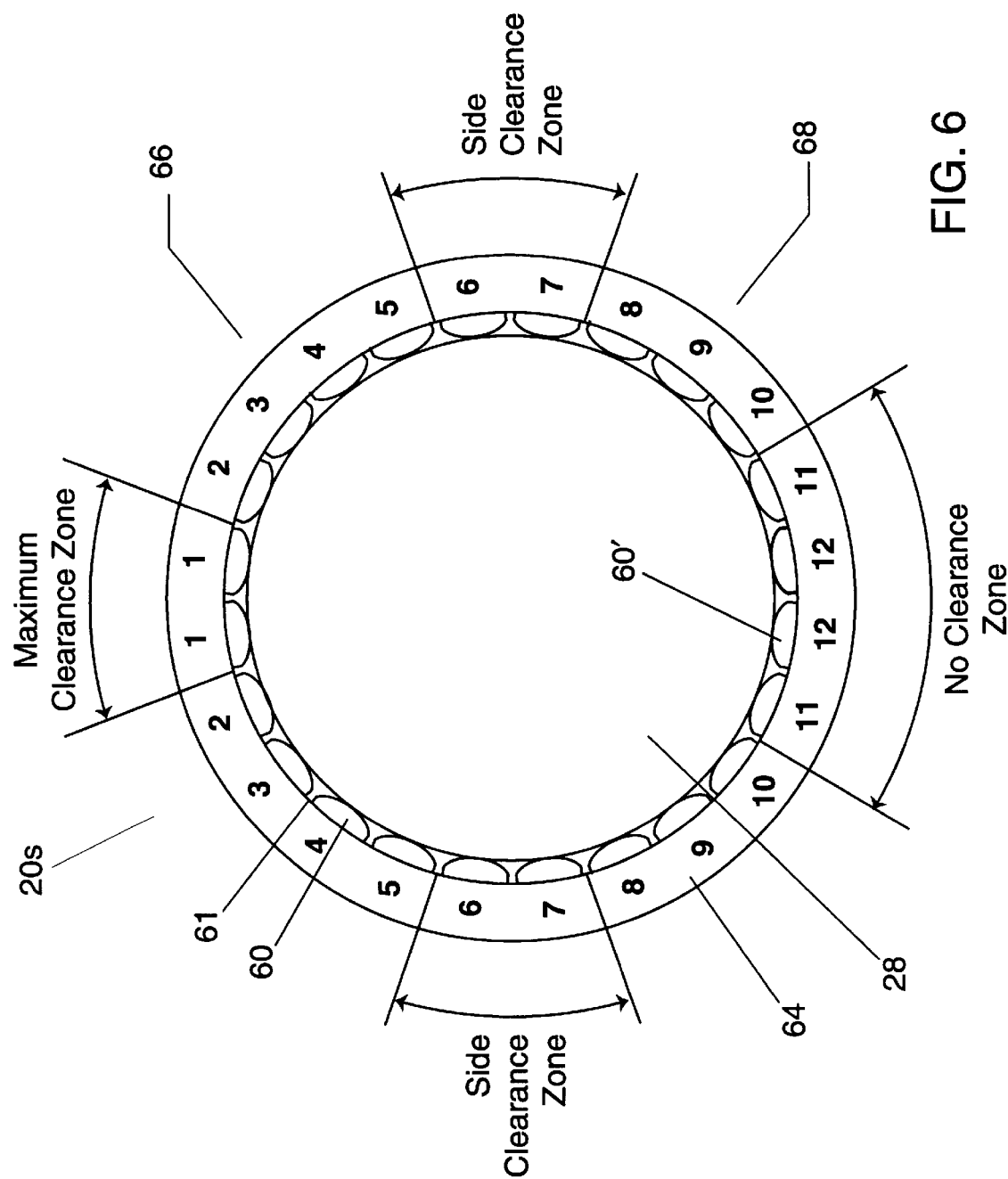
FIG. 6 is a diagrammatic elevational end view of the inventive stave bearing shown in FIG. 5.
Figure 7:
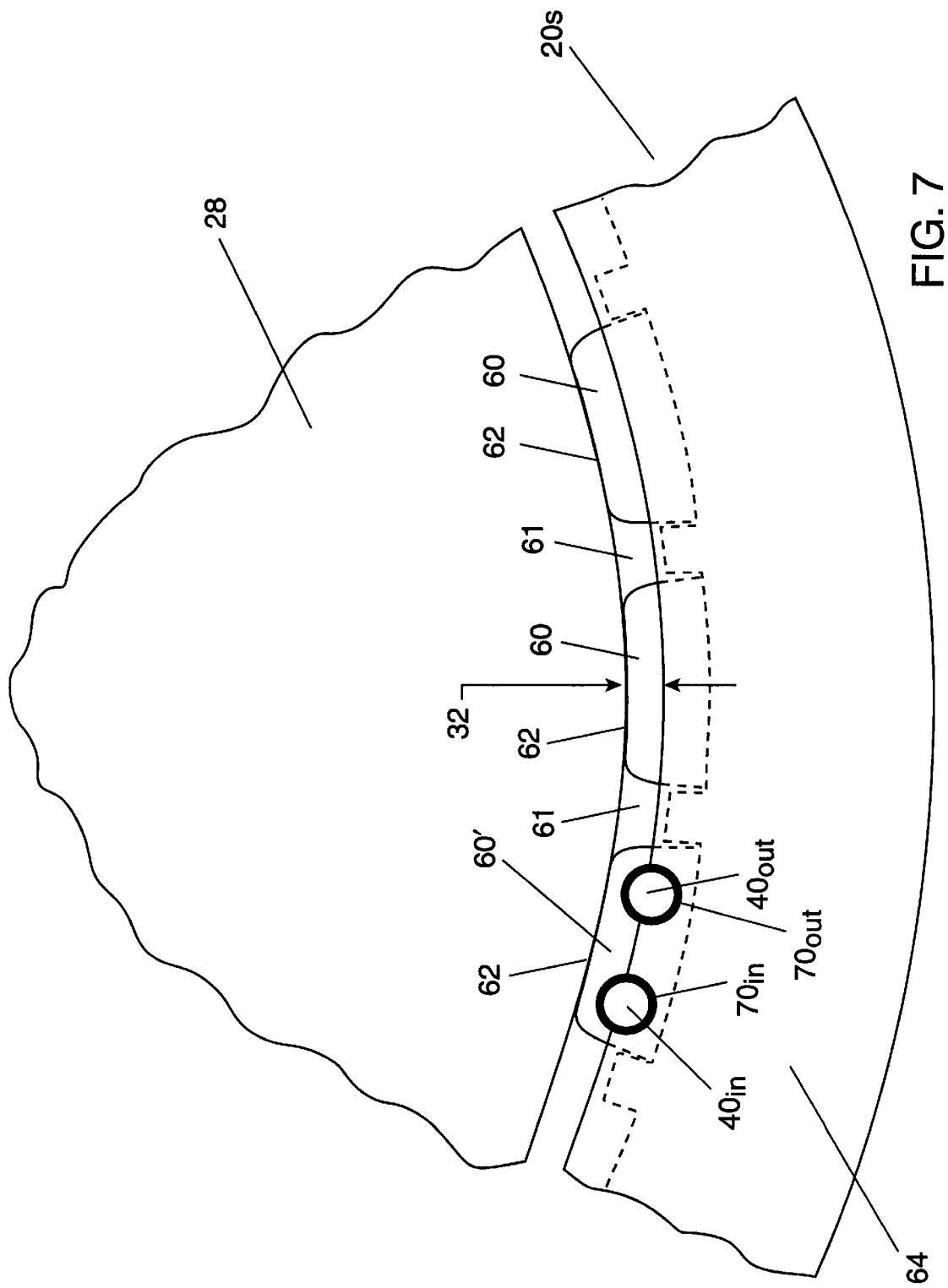
FIG. 7 is a partial and enlarged version, with some interior detail shown, of the view shown in FIG.

Referring to FIG. 6 and FIG. 7, the depicted example of stave bearing 20s has twenty-four staves 60. For illustration purposes, stave bearing 20s can be conceived to be either strut bearing $20s_1$ or stern tube bearing $20s_2$. Two stave retainers 64 (one shown), one stave retainer 60 at each end of stave bearing 20s, are used for securing staves 60. Stave bearing 20s can be conceived to have an upper bearing half 66 and a lower bearing half 68. Staves 60 are numbered consecutively for designation purposes.

Generally speaking, in the context of the contemplated mechanical bearing system, shaft 28 will more closely engage lower bearing half 68 than upper bearing half 66. More specifically, the bottom four staves, situated in the "no clearance zone" and numbered "11" and "12," will encounter the most wear; the top two staves, situated in the "maximum clearance zone" and numbered "1," will encounter the least wear.

Prudent engineering would generally dictate that the selection of the stave or staves for inventive accommodation be based at least in part on the location(s) and degree(s) of anticipated wear. Practical and economic considerations may come into play, as well. It may be preferable, for instance, to select a single stave 60 (such as inventive stave sensor 60' shown in FIG. 5 and FIG. 6 and shown more clearly in FIG. 7) located in the "no clearance zone" for inventive implementation. The location(s) of the wear measurements to be made should be selected carefully in order to obtain meaningful condition assessment results.

Figure 8:
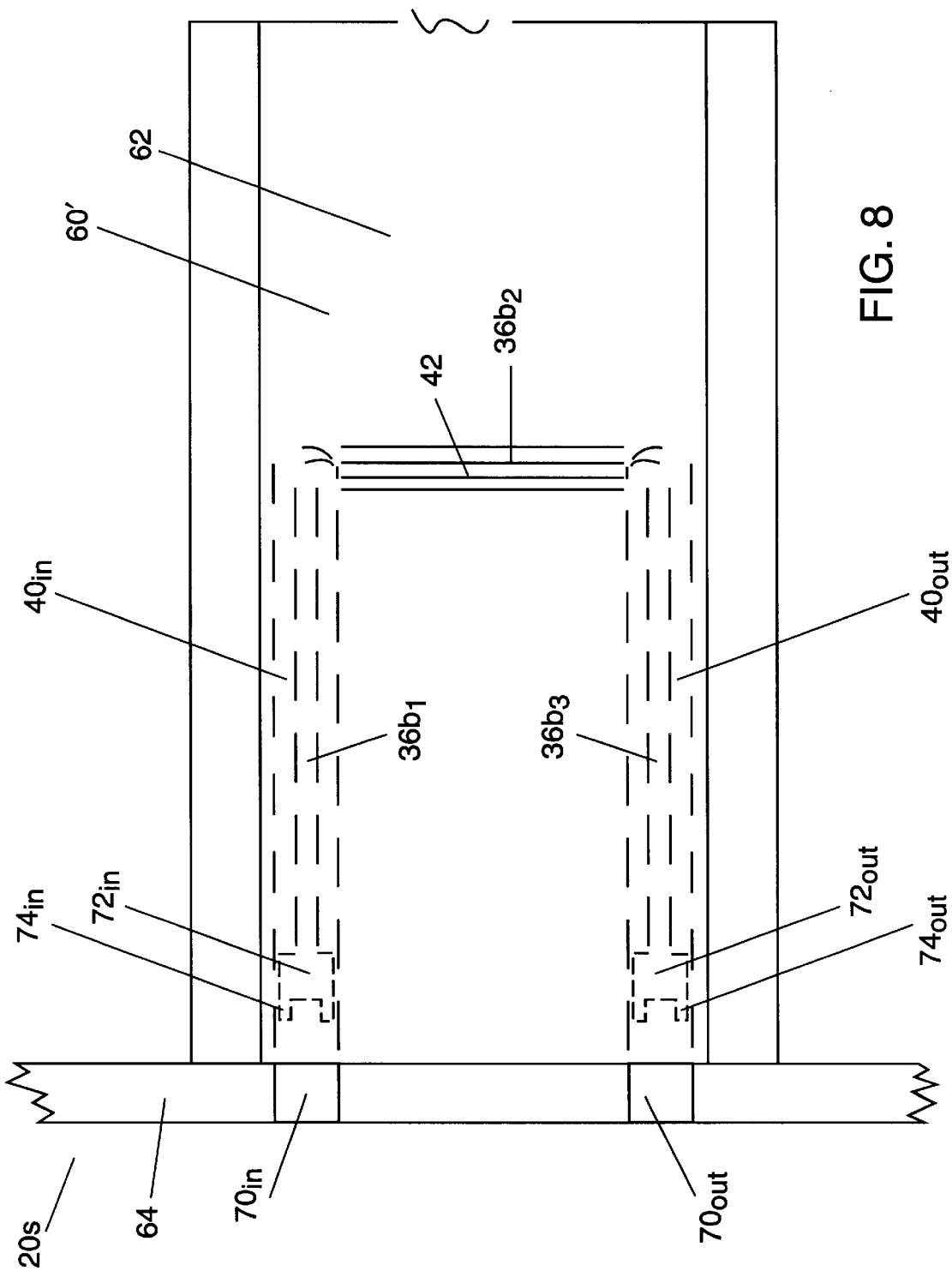
FIG. 8 is a diagrammatic partial plan view, with some interior detail shown, of the inventive stave and the stave retainer ring shown in FIG. 6 and FIG. 7.

Inventively wear-sensing stave 60' has been provided with two stave-end passages (e.g., conduits or bores) $40_{in}$ and $40_{out}$. Retainer ring 64 has been provided with two retainer ring notches $70_{in}$ and $70_{out}$ which approximately align, respectively, with passages $40_{in}$ and $40_{out}$. Still with reference to FIG. 3 through FIG. 7 and particularly with reference to FIG. 8 10. and FIG. 9, each of stave-end passages $40_{in}$ and $40_{out}$ is configured at the passage entrance with a countersink (countersunk hole), thereby facilitating installation wherein a hammer is used to drive the stave down a dovetail (tenon). Countersink $74_{in}$ permits recessed fitting of waterproof connector $72_{in}$. Countersink $74_{out}$ permits recessed fitting of waterproof connector $72_{out}$.

Connectors $72_{in}$ and $72_{out}$ are the end terminals for engagement fiber optic bundle segment 36b. Nonengagement fiber optic bundle segment 36a leads from light source 46 to connector $72_{in}$. Connector $72_{in}$ engages the inlet end of ingressive bundle segment $36_1$, which is embedded in stave-end passage $40_{in}$. Wear bundle segment $36_2$ is embedded in transverse stave channel (e.g., groove, furrow, conduit or slot) 42. Egressive bundle segment $36b_3$ is embedded in stave-end passage $40_{out}$. Connector $72_{out}$ engages the outlet end of egressive bundle segment $36b_3$. Nonengagement fiber optic bundle segment 36c leads from connector $72_{out}$ to light receptor 48. Light receptor 48 is included in data acquisition system 50, where the transmitted light may be observed.

Stave-end passages $40_{in}$ and $40_{out}$ are each oriented approximately in the axial (longitudinal) direction of stave bearing 20s, approximately parallel to stave surface 62. Channel 42 is oriented transversely with respect to stave 60', approximately in the circumferential direction of stave bearing 20s.

Fiber optic wear bundle segment $36b_2$ is situated so that it is exposed and so that its "apex" (the topmost linear portion which it generally defines) is even or nearly even with stave surface 62. The disintegration or deterioration of wear bundle segment $36_2$ correlates with the wear of stave 60' at stave surface 62.

Currently, the U.S. Navy is implementing on-line monitoring systems for some of its vessels. In particular, the "Integrated Condition Assessment System" (ICAS), which is already operating onboard several U.S. Naval ships, performs sensor data acquisition, data processing, storage and display. At the present time, the ICAS measures and records the temperature of the inboard bearings; however, the ICAS does not at all monitor the external outboard water lubricated bearing system.

Routing a fiber optic signal from the outboard bearing to a visual indicator underwater or to a data acquisition system internal to the hull presents many design challenges. Simple schemes using low technology components such as a magnifier/viewer and a light source may be all that is necessary for an underwater observation.

A low technology viewer can be used in such a way that each illuminated fiber plus the associated spacing corresponds to a specific amount of wear, or ideally to a specific range of the total allowable amount of wear, e.g., in accordance with U.S. Navy specifications. A temporary light source can be provided by a diver's flashlight; the flashlight would shine into one end of the view port and would be observed at the other. To protect the viewer ends, the assembly might be countersunk in the fairwater with a screw cover. In inventive operation, as the optical fiber wears, the passage of light diminishes, thereby indicating the amount of wear.

In inventive practice of less complicated schemes of this kind, a typical approach would perhaps include the visible presence of one or more illuminative dots at the light-exit viewing end. For instance, there may be several illuminative dots which serve to represent gradations in the degree of wear. Each illuminative dot is associated with its own optical fiber. If there has been no wear, for example, all the dots are illuminated. If there has been some wear, fewer than all the dots are illuminated; the non-illuminated dots correspond to an amount of wear, and the illuminated dots correspond to an amount of material remaining).

A more desirable, albeit more complex, inventive arrangement is to route a fiber optic cable from the bearing through the strut and into the ship, where an interface to the ship's computer network may be possible. In inventive practice of these more complicated sensor systems, the stave sensor output would be conditioned and interfaced to the ship's control system. Propeller blades on a U.S. Coast Guard icebreaker, the POLAR STAR, have been instrumented with fiber optic strain sensors in this manner; see Troy, Charles T., "Fiber Optic Smart Structures: A Technology Ahead of Its Time is Finally Winning Acceptance," *Photonics Spectra*, Vol. 31, Issue May 5, 1997, pp 112–127, incorporated herein by reference. The U.S. Navy has already begun to use an analogous system called "Integrated Condition Assessment system" (UCAS), which performs sensor data acquisition, data processing, storage and display.

Incorporated herein by reference is EI-Sherif U.S. Pat. No. 5,060,307 issued Oct. 22, 1991, entitled "Apparatus and a Method Comprising an Optical Fiber Modulator, Coupler, Switch, Sensor and Distribution System." Other U.S. patents of note, each of which is incorporated herein by reference, are: Rode et al U.S. Pat. No. 4,348,665 issued Sep. 7, 1982; Rouam U.S. Pat. No. 4,143,319 issued Mar. 6, 1979; Schutz et al. U.S. Pat. No. 4,509,364 issued Apr. 9, 1985; Jensen U.S. Pat. No. 4,328,462 issued May 4, 1982; Purvis et al. U.S. Pat. No. 4,655,077 issued Apr. 7, 1987; Riegler et al. U.S. Pat. No. 4,092,053 issued May 30, 1978; Slough U.S. Pat. No. 4,107,603 issued Aug. 15, 1978; Considine U.S. Pat. No. 3,981,621 issued Sep. 21, 1976; Fukuyoshi et al. U.S. Pat. No. 5,258,930 issued Nov. 2, 1993.

Reference now being made to FIG. 10 and FIG. 11, the present invention can be practiced onboard U.S. Naval ships so as to provide condition assessment in real time of the the installed outboard water lubricated bearings, and can accomplish this while blending nicely with existing on-line monitoring technology. The inventively proposed sensor system dubbed "Intelligent Shaft Line System" (ISS) would provide continuous knowledge of bearing wear condition, bearing load and shaft alignment throughout the life cycle of the ship.

An affordable inventive sensor system such as ISS would include intelligent software for coordinating sensor data with user-friendly graphic displays. Engineers would thereby "data-trend" shaft system health and therefore perform better repair planning. A screen graphic such as graphic display 76 shown in FIG. 10 would be viewed in real time. A particular stave sensor can be selected for an indicator report by adjusting a track ball, for example, or by entering a numerical designation for the forward, aft, port or starboard location.

Based on dynamic shaft measurement techniques and on information generated by other stave sensing mechanisms, "smart" algorithms can be integrated so as to provide a screen graphic (such as shown in FIG. 10) which includes not only a bearing wear profile but which also includes one or more of the following: a shaft alignment profile; a temperature profile; a pressure profile; a vibration profile. That is, the fiber optic cable(s) which is(are) used to communicate data pertaining to wear of a bearing surface can additionally be used to communicate data pertaining to pressure, temperature, vibration and/or alignment.

To briefly digress, proper alignment of the shaft system is critical to ship operation. Conventional approaches to evaluating static shaft alignment have included optics, gap and sag, and a hydraulic jack/load cell to measure static bearing reactions.

Modern techniques for evaluating static shaft alignment have developed which rely on bonded strain gages to determine shaft line bending moments; see Bouve M. S., R. M. DeJesus and J. E. Reed, "Main Propulsion shaft Alignment Assessments Using Strain Gage Technology," Paper No. 10, ASNE 1993 Fleet Maintenance Symposium, incorporated herein by reference; Vassilopoulos, L., "Computer-Aided Telemetry Systems for Shipboard Rotating Machinery Investigations," Paper No. 25, 1987 Ship Operations Management and Economics International Symposium, SNAME, incorporated herein by reference.

Regardless of the alignment assessment technique, the outboard bearing reactions are often assumed for an in-the-water alignment, in which case only the inboard bearing reactions are known. The ship condition and/or operational mission may affect alignment and bearing loading; both vary throughout the life cycle of the system. Static factors include hull deflections from ship location (i.e., dry dock versus afloat pier-side), liquid loading, direct sunlight, and hogging and sagging. Dynamic factors include thermal growth, sea state, torque roll, thrust and rudder positions.

Other technologies can be integrated into an on-line monitoring system so as to allow visualization of pressure and temperature sensor data via the same fiber optic data bus, such as readout 78 shown in FIG. 11. In this regard, an emerging low cost technology of note uses spatial modulation for viewing both the integrity of the signal and the resolution of the signal with respect to a physical amount of stress; see EI-Sherif, M. A. and Fran Ko, "Co-braiding of sensitive optical fiber sensor in 3-D composite fiber network," 2/SPIE Vol. 1798 Fiber Optic Smart Structures and Skins V, 1992, incorporated herein by reference.

Standard practice regarding bearing wear is bearing wear-down until replacement, in accordance with "Propulsion Bearing and Seals," NAVSEA S9086-HN-STM-010/CH-244R4, Mar. 22, 1996, incorporated herein by reference. There is an envelope of operation, i.e., a range of allowable wear. This range is graphically depicted as bounded by the installed clearance versus the repair condition. Beyond replacement is a more severe failure mode involving wear into the backing material; this may score or roughen the shaft sleeve and may establish a pattern for higher than normal future wear rates. Wear of a stave bearing beyond the backing and into the retainer and dove tail slots causes metal-to-metal contact; this is catastrophic failure.

The eventuality of catastrophic failure provides justification for an inventive sensor system such as the Intelligent Shaft Line System (ISS). Catastrophic failures in several ship classes have resulted in emergency drydocking and repairs. The detection of excessive waterborne bearing wear prior to the occurrence of major structural damage is critical to avoiding these costly emergency dry-docking repairs, which can run into the millions of dollars. Furthermore, ship maintenance and repair budget considerations are driving the need to defer scheduled dry-docking periods.

Maintenance of the waterborne bearings is among the factors which determine the need for dry-docking. Remote monitoring according to this invention would allow for condition-based maintenance of these bearings. This would result in better planning of the dry-dock repair cycle, based on actual equipment condition assessment. This same knowledge would allow better workload planning by the waterfront community, thus leading to more efficient use of dry-dock availability.

Currently, the stave-to-shaft clearance for an outboard bearing is measured periodically by a diver during underwater inspections. The stave bearing is often sealed by a fairwater and/or ropeguard to protect the shaft from debris and to smooth the water flow around the shaft. Typically, access holes are provided to permit the diver to implement a feeler gauge for measuring the clearance between the shaft and the retainer ring. This measurement provides an approximate "absolute" clearance which takes into account not only bearing wear-down but also such phenomena as tolerance stack-up, compression set, elastic deformation and alignment.

An inventive embedded fiber optic wear sensor system would remotely measure bearing wear in a "relative" fashion, i.e., so as to only take bearing wear-down into account. Such an inventive system would not require access holes for external bearing wear measurements, but instead would provide one-line assessment of bearing wear condition which would prove more accurate than manual gauging.

To elaborate, in theory a bearing stave is ready for replacement when the wearing surface has worn from the stave surface according to the standard practice described in the above-mentioned NAVSEA S9086-HN-STM-010/CH-244R4. The present methodology for measuring the operating clearance using a manual gauge encompasses several phenomena; that is, in addition to wear of the bearing (specifically, wear of one or more staves, in the case of a stave bearing), manual gauging measures a variety of other environmental effects, including the following: (i) compression of the rubber as it takes a permanent set (sometimes referred to as "stave crush" or, in the dynamic sense, "elastic deformation"); (ii) misalignment of the shaft; (iii) thermal growth; (iv) wear of the shaft (or shaft sleeve).

The present invention measures relative weardown in much the same way that a tire tread indicator (which is molded into the tire pattern) measures relative weardown. The relative wear assessment involves ascertaining the condition of the bearing (e.g., stave) in terms of wear and independently of factors such as compression set and elastic deformation; hence, wear of the bearing itself is the solitary measured phenomenon of many inventive embodiments. Bearing wear is the inventive touchstone.

For some inventive embodiments, it may be further propitious to expand the measured phenomena to bearing wear plus shaft alignment. Since the wear pattern manifested by the bearing surface is indicative of the shaft alignment condition, it may make sense to effectuate an inventive sensing system whereby both related phenomena are observed; the viability of such a system may depend on the number of locations of wear measurement and on the locations themselves.

Of course, one should not underestimate the importance of either relative wear measurement or absolute wear measurement. Relative wear determination in accordance with the present invention can provide a quick, low cost assessment of bearing health, including whether and when an absolute wear determination should be made. The efficacy of relative wear assessment is founded on the usual circumstance that, over time, wear of the shaft (or shaft sleeve) tends to be minimal, whereas wear of the bearing (e.g., bearing stave) tends to be greater. This circumstance has something to do with the more wear-resistant material composition of the shaft (or shaft sleeve) at its wear surface and the less wear-resistant material composition of the bearing at its wear surface.

Structural health monitoring systems employing sacrificial, embedded optical filaments have been proposed since the early 1980's, primarily for composite structures. See Crane, Roger M., A. B. Macander, and James Gagorick, "Fiber Optic Assessment system for Fiber Reinforced Plastic Composite Structures," DTNSRDC SME-82/92, November 1982, incorporated herein by reference. As disclosed therein, a fiber optic filament is embedded into the structure in such a way that, if during its life cycle the loading exceeds the strength at the location of attachment, the optical filament breaks and the excessive load condition can be detected. These and more complex embedded sensor systems are now in use on air and space vehicles and civilian structures. See Udd, Eric, *Fiber Optic Smart Structures*, John Wiley and Sons, In., New York, 1995, incorporated herein by reference.

Optical fiber sensors can have several advantages over conventional sensors for machinery applications. See Whitesel, Henry K., Christopher P. Nemarich, Michael J. Ransford, "Fiber Optic Sensors for Machinery Monitoring and Control," 48th Meeting of the Society for Machinery Failure Prevention Technology, Wakefield, Mass, Apr. 20, 1994, pp 307–317, incorporated herein by reference.

Optical fiber sensors generally are smaller in size and weight than are other kinds of sensors. Moreover, optical fiber sensors can be embedded into rubbers and composites, and now even into metal structures. Optical fiber sensors are immune to EMI and can provide distributed or multiplexed measurements.

Fiber optics are already in use in many U.S. Navy ships; therefore, the infrastructure to support inventive practice of fiber optics exists within the fleet. See Coyle, Daniel, J., Richard J. Patterson, "Fiber Optics for Combat Ships," ASNE Intelligent Ships Symposium, Nov. 25–26, 1996, Philadelphia, Pa., pp 53–64, incorporated herein by reference.

Fiber optic sensor types which have been embedded for structural analysis include: Figer Bragg Grating; Long Period Grating; micro-bend interferometer; Fabry-Periot interferometer. Fiber optic measurement of strain, temperature, pressure, torque, vibration and acoustic fields have all been demonstrated.

In addition to applications involving structural analysis, such as above-noted, fiber optic technology has more recently been considered for purposes of wear determination. See Satake et al. U.S. Pat. No. 4,884,434 issued Dec. 5, 1989, incorporated herein by reference; Uejio U.S. Pat. No. 5,015,859 issued May 14, 1991, incorporated herein by reference.

A material wear system differs considerably from structural loading, and these differences must be taken into consideration in the development phase of an inventive wear monitoring system. Table 1 hereinbelow lists general considerations for the development of an embedded fiber optic sensor, particularly one which is a stave sensor. See, e.g., Crane et al., "Fiber Optic Assessment system for Fiber Reinforced Plastic Composite Structures," supra; Udd, *Fiber Optic Smart Structures*, supra; Sun D., K. Kalli and R. O. Caus, "Optical Fiber Embedment and Attachment: Techniques and Survivability Issues, "Fiber & Electro-Optics Research Center, Electrical Engineering Department, Virginia Tech Univ., Blacksburg, Va., CARDIVNSWC-TR-85-CR-94/03 March 1994, incorporated herein by reference.; Bhatia, Vikram, Vivek Arya, Tiffanie d'Alberto, et al., "Grating Based Optical Fiber Sensors for Structural Analysis," 51st Meeting of the Society for Machinery Failure Prevention Technology, Virginia Beach, Va., Apr. 14–18, 1997, pp 231–240, incorporated herein by reference. Bench top simulative testing which addresses each of the concerns listed in Table 1 should lead to the development of a qualified shipboard product.

TABLE 1

STAVE SENSOR DEVELOPMENT CONSIDERATIONS

| Consideration | Requirement |
| --- | --- |
| Location of Wear Points | Top, bottom and side to side at |
| Relative | both ends for wear and alignment. |
| Absolute | Measure only stave surface normally. |
| | Measure shaft to bore clearance to determine sleeve condition. |
| Adhesion of Fiber to Matrix | Bond strength that prevents fiber pull-out. |
| | Structural integrity and strength. |
| Wear Mode of Fiber against Shaft | Does not affect shaft (e.g., scoring shaft). |
| Abrasion | |
| Rubbing | Wears similar to stave under abrasion. |
| Failure Mode | |
| | Wears similar to stave under rubbing. |
| | Failure of sensor has no effect on bearing. |
| Thermal Effects | Thermal compatibility with stave material. |
| Cycling | |
| Water Starvation (high heat) | Does not have great thermal mismatch. |
| | Survival from water starvation to the extent of a stave. |
| Fiber Optic Ingress/Egress | Fiber optic cable at material interface survives seawater/ harsh environment |
| Flexibility | Fibers must have similar moduls as stave. |
| Assembly | Fiber and egress/connectors must survive rigors of shipyard installation. |
| Robustness | Must operate under a wide range of temperatures and conditions, e.g., vibration and exposure to seawater. |
| Measurement Performance | Must perform to desired accuracy and repeatability. No false alarm indications, no missed failures. |
| Life Expectancy | Systems must last the life cycle of the bearing, as no repairs to the sensor will be made. |
| Ability to increase capability | Embedding fibers allows upgrade to temperature and pressure measurement. |
| Interface Requirements | Must interface to ship data acquisition and control and display system, e.g., ICAS |

According to some embodiments of this invention, plastic (or glass) optical fibers are bonded into the inwardly facing surface of the bearing. According to many inventive stave bearing embodiments, the optical fibers are bonded into the inwardly facing surface of each of one or more staves. The diameter and the spacing of the optical fibers are designed to provide an indication of bearing (e.g., stave) wear over the desired range. Nevertheless, the inventive bearing wear sensor is a concept which requires validation, especially with regard to how to accomplish the actual embedment of the optical fibers.

Basically, there are two proposed inventive fabrication approaches for the inventive installation of one or more optical fibers. Both methods may be acceptable or may provide variable results which merit further exploration. A single optical fiber or plural optical fibers can be installed using either approach; however, many inventive embodiments preferably implement a plurality of optical fibers.

One possible inventive method for installing the optical fiber or fibers involves the freezing of a rubber bearing (or of a rubber bearing part such as a stave), and the machining of small openings and indentations. At least one axial pilot hole is machined into the bearing member. At least one circumferential groove is machined across the inner face (the wearing surface) of the bearing member. The fiber optic filament or filaments are then inserted through a hole and threaded through the hole(s) and groove(s). A compatible adhesive is used to hold the fiber optic filaments in place.

Another possible inventive method for fiber optic embedment represents the preferred approach for many inventive embodiments. This inventive method involves mold processing wherein the optical fiber or optical fibers are embedded during fabrication. In other words, the bearing is fabricated together with the fiber element(s) in the mold. This is perhaps a more ideal method, since the best possible bonds may thus be attained. Such manufacturing techniques may vary according to the nature of the materials processing for the composite bearing. The preform layout pattern for a continuous-surface bearing would be similar to that for a discrete-surface bearing; in either case, the fiber optic line (e.g., bundle) enters the bearing member approximately axially and orients along an inside bearing surface approximately circumferentially, in anticipation of the fiber optic line's wearing approximately circumferentially (the direction of rotation of the shaft) due to contact with the s haft.

However, mold processing may pose some engineering challenges in view of the processing temperatures and the possibly ensuing thermal and processing distortions. The heat during processing may be problematical because most off-the-shelf plastic optical fiber degrades at these processing temperatures. At present, for instance, polycarbonate fibers of 0.25 mm a re readily available at about $0.50 per foot; nevertheless, these fibers have a thermal limit and a hardness which may not be optimal. The limits of accuracy may be extended by optimal techniques to bel explored. A plastic fiber system will need to be selected for inventive practice which will have structural characteristics more consistent with the structure of rubber and thermal characteristics which meet processing temperatures.

A possible approach to circumventing or alleviating the problems attendant fabrication via mold processing is to effect modifications of the materials and/or of the process. For instance, it may be propitious to develop an inventive stave sensor (wear-sensing stave), or a section thereof, which is shaped to meet form, fit and function of a particular application, yet has slightly different material characteristics due to material variation and processing differences.

This invention admits of a diversity of embodiments. There is inventive variability with respect to several aspects and parameters, including: type of bearing; thickness (depth from top surface to bottom demarcation) of bearing wear portion; placement of fiber optic line segment(s) within bearing wear portion; number of fiber optic line(s); configuration (discreteness versus bundling) of optical fiber(s); width of fiber optic line(s).

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. The wear detector combination comprising a bearing member and a fiber optic line, said fiber optic line including at least one optical fiber, said bearing member including a bearing surface, said fiber optic line accessing and exiting said bearing member whereby a segment of said fiber optic line is embedded at said bearing surface.

2. The wear detector combination as in claim 1 comprising a light emitter and a light receptor, said light emitter connected at a first end of said fiber optic line, said light receptor connected at a second end of said fiber optic line, wherein said bearing surface is for sliding contact with a relatively moving body, wherein said light emitter emits a first amount of light, wherein said light receptor receives a second amount of light which follows the transmission of said first amount of light through said segment of said fiber optic line, and wherein the diminution of said second amount of light versus said first amount of light is a function of the deterioration of said segment of said fiber optic line.

3. The wear detector combination as in claim 2, wherein said deterioration of said segment of said fiber optic line is commensurate with the wear of said bearing surface.

4. The wear detector combination as in claim 2, wherein said diminution of said second amount of light is evidential, of said wear of said bearing surface.

5. The wear detector combination as in claim 4, wherein said bearing member includes a bearing wear portion which includes a lower wear portion demarcation and at least a part of said bearing surface, said bearing wear portion is generally characterized by a wear portion thickness which is approximately the distance between said bearing surface and said lower wear portion demarcation, said fiber optic line is generally characterized by a line width, and said segment of said fiber optic line is embedded at said bearing surface in said bearing wear portion to a depth which approximately ranges between one-half said line width below said bearing surface and one-half said line width below said lower wear portion demarcation.

6. A wear-sensing device comprising fiber optic means and bearing means, said bearing means having passage means and an inwardly-facing surface which is provided with channel means communicating with said passage means, said bearing means thereby being adapted to accommodating ingress and egress of said fiber optic means whereby said channel means retains a portion of said fiber optic means, and whereby said portion of said fiber optic means is nearly flush with respect to said inwardly-facing surface.

7. A wear-sensing device as in claim 6, wherein:
said inwardly-facing surface is for slidably contacting another object;
a degree of disintegration of said portion of said fiber optic means results from said slidably contacting;
a degree of wear of said inwardly-facing surface results from said slidably contacting; and
said degree of disintegration is indicative of said degree of wear.

8. A wear-sensing device as in claim 7 comprising a light source and data acquisition means, wherein light originates from said light source and is transmitted by said fiber optic means to said data acquisition means, wherein reduction of said light occurs in accordance with said degree of disintegration of said portion of said fiber optic means, wherein said data acquisition means includes means for correlating said reduction of said light with said degree of wear of said inwardly-facing surface, and wherein said data acquisition means includes means for displaying information pertaining to said correlating.

9. A wear-sensing device as in claim 6, wherein said fiber optic means includes at least one optical fiber.

10. A wear-sensing device as in claim 9, wherein said fiber optic means includes a plurality of optical fibers which are bundled.

11. A wear-sensing device as in claim 9, wherein said fiber optic means includes a plurality of optical fibers which are discrete.

12. A wear-sensing device as in claim 9, wherein:
said bearing means has a wear portion which includes at least a portion of said inwardly-facing surface and a selected delimitation, said selected delimitation being generally opposite said at least a portion of said inwardly facing surface;
said fiber optic means has an approximate imaginary centerline and an approximate diameter;
the portion of said centerline which corresponds to said portion of said fiber optic means is generally situated in said wear portion in the range between approximate coincidence of said centerline with said at least a portion of said inwardly-facing surface and approximate coincidence of said centerline with said selected delimitation.

13. A wear-sensing device as in claim 6, wherein:
said bearing means includes a continuous-surface bearing;
said inwardly-facing surface is an inwardly-facing surface of said continuous-surface bearing, said inwardly-facing surface having a so circumference and a curvilinear shape in the circumferential direction; and
said portion of said fiber optic means is retained by said channel means so as to be disposed approximately in said circumferential direction over at least a part of said circumference.

14. A wear-sensing device as in claim 6, wherein:
said bearing means includes a discontinuous-surface bearing, said discontinuous-surface bearing including at least one discrete bearing member having a width taken in said circumferential direction;
said inwardly-facing surface is an inwardly-facing surface of a said discrete bearing member; and
said portion of said fiber optic means is retained by said channel means so as to be disposed approximately in said circumferential direction over at least a part of said width.

15. For a mechanical system of the type including a rotatable shaft and a bearing, wherein said bearing includes an inside bearing surface and wherein said rotatable shaft is in slidable engagement with said inside bearing surface, a method of ascertaining wear of said inside bearing surface which is consequential of said engagement, said method comprising:

providing a fiber optic bundle having a substantially uniform fiber optic thickness, a first fiber optic end, a second fiber optic end and a total fiber optic length between said first fiber optic end and said second fiber optic end, said total fiber length including a partial fiber optic length intermediate said first fiber optic end and said second fiber optic end;

associating said fiber optic bundle with said bearing, said associating including entrenching said partial fiber optic length in said inside bearing surface whereby said partial fiber optic length reaches a substantially uniform depth beneath said inside bearing surface which is at least fifty percent of said fiber optic thickness;

transmitting light through said total fiber optic length from said first fiber optic end to said second fiber optic end; and comparing the quantity of said transmitted light at said first fiber optic end with the quantity of said transmitted light at said second fiber optic end.

16. A method of ascertaining wear as in claim 15, wherein said bearing includes a lateral bearing surface, and wherein said associating includes:
providing a groove in said inside bearing surface;
providing a bore in said bearing, said bore extending from said lateral bearing surface to said groove;
inletting said fiber optic bundle through said bore;
placing said partial fiber optic length in said groove; and
outletting said fiber optic bundle through said bore.

17. A method of ascertaining wear as in claim 15, wherein said bearing is at least partially made of an elastomeric material, and wherein said associating includes integrally curing said elastomeric material and a portion of said said fiber optic bundle, said portion including said partial fiber optic length.

18. A method of ascertaining wear as in claim 17, wherein said bearing includes a lateral bearing surface, and wherein said associating includes inletting and outletting said fiber optic bundle at said lateral bearing surface.

19. A method of ascertaining wear as in claim 18, wherein said inside bearing surface substantially defines a cylinder, and wherein said associating includes approximately orienting said partial fiber optic length in a circumferential direction of said cylinder.

20. A method of ascertaining wear as in claim 19, wherein said bearing is a stave bearing having a pair of stave retainers and a plurality of staves, each said stave having an inside bearing subsurface, wherein a said stave retainer includes said lateral bearing surface, wherein said inside bearing surface includes each said inside bearing subsurface, and wherein said entrenching includes entrenching in a said inside bearing subsurface.

* * * * *